United States Patent
Johnson et al.

(10) Patent No.: US 7,439,948 B2
(45) Date of Patent: Oct. 21, 2008

(54) ELECTROPHORETIC DISPLAY DEVICE

(75) Inventors: Mark Thomas Johnson, Eindhoven (NL); Dirk Kornelis Gerhardus De Boer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 494 days.

(21) Appl. No.: 10/095,830

(22) Filed: Mar. 12, 2002

(65) Prior Publication Data
US 2004/0036951 A1     Feb. 26, 2004

(30) Foreign Application Priority Data
Mar. 14, 2001   (EP) ................................. 01200952

(51) Int. Cl.
*G09G 3/34*     (2006.01)
*G02B 26/00*    (2006.01)
(52) U.S. Cl. ....................... 345/107; 359/295
(58) Field of Classification Search ................. 345/107, 345/109
See application file for complete search history.

(56) References Cited

U.S. PATENT DOCUMENTS

| | | | | |
|---|---|---|---|---|
| 5,892,497 A | * | 4/1999 | Robertson | 345/107 |
| 6,369,792 B1 | * | 4/2002 | Kikinis | 345/107 |
| 6,639,580 B1 | * | 10/2003 | Kishi et al. | 345/107 |
| 6,738,039 B2 | * | 5/2004 | Goden | 345/107 |
| 2002/0113770 A1 | * | 8/2002 | Jacobson et al. | 345/107 |

OTHER PUBLICATIONS

AAPA: "New Reflective Display Based on Total Internal Reflection in Prismatic Microstructure" Proc. 20th IDRC onference, pp. 311-314 (2000).*
"Development of In-Plane EPD", SID 2000 Digest, pp. 24-27.
"New Reflective Display Based on Total Interna Reflection in Prismatic Microstructures", Proc. 20$^{th}$ IDRC conference, pp. 311-314 (2000).
"Micro-encapsulated Electrophoretic Materials for Electronic Paper Displays", 20$^{th}$ IDRC conference, pp. 84-87 (2000).

* cited by examiner

*Primary Examiner*—Duc Q Dinh
(74) *Attorney, Agent, or Firm*—Michael E. Belk

(57) ABSTRACT

In electrophoretic displays, grey values are realized using at least three electrodes for bistable operation.

13 Claims, 6 Drawing Sheets

ELECTROPHORETIC DISPLAY DEVICE

The invention relates to an electrophoretic display device comprising at least one pixel with an electrophoretic medium, and two switching electrodes, as well as drive means via which the pixel can be brought to different optical states. Where a switching electrode is mentioned in this application, it may be divided, if desired, into a plurality of sub-electrodes which are supplied with one and the same voltage either externally or via switching elements.

Electrophoretic display devices are based on the motion of charged, usually colored particles under the influence of an electric field between two extreme states having a different transmissivity or reflectivity. With these display devices, dark (colored) characters can be imaged on a light (colored) background, and vice versa.

Electrophoretic display devices are therefore notably used in display devices taking over the function of paper, referred to as the "white paper" applications (electronic newspapers, electronic diaries).

In the known electrophoretic display devices with an electrophoretic medium between two switching electrodes, the switching electrodes are supplied with drive voltages. The pixel may then be brought exclusively to two extreme optical states. One of the switching electrodes is then realized, for example, as two mutually interconnected narrow conducting strips on the upper side of a display element. At a positive voltage across this switching electrode with respect to a bottom electrode covering the entire bottom surface of the display element, charged particles (negatively charged in this example) move to the potential plane which is defined by the two interconnected narrow conducting strips. The (negatively) charged particles spread across the front face of the display element (pixel) which then assumes the color of the charged particles. At a negative voltage across the switching electrode with respect to the bottom electrode, the (negatively) charged particles spread across the bottom face so that the display element (pixel) assumes the color of the liquid.

In practice, there is an ever increasing need for displaying intermediate optical states (referred to as grey values). Known methods of introducing grey values are usually not satisfactory. For example, electrophoretic display devices are too slow to introduce grey values via time-weighted drive periods (time ratio grey scale). Division of the pixel into different surfaces (area ratio grey scale) usually requires barriers between the different sub-pixels so as to prevent mutual crosstalk.

It is an object of the present invention to meet this drawback. In an electrophoretic display device according to the invention, grey values (intermediate optical states) are introduced by providing the pixel with at least one further electrode and drive means for supplying the further electrode with electric voltages.

The invention is based on the recognition that the electric field within a display cell can be influenced by means of electric voltages on the further electrode in such a way that, in the example described above, the electric field lines at a positive voltage across the switching electrode with respect to the bottom electrode are disturbed in such a way that the negatively charged particles move towards a portion of the surface between the two electrodes. Dependent on the electric voltages across the switching electrodes and one (or more) further electrode(s), more or fewer particles move towards the surface between the two electrodes and different intermediate optical states (grey values) are obtained.

To obtain a satisfactory distribution across the surface between the two electrodes when the settings are changed, it is preferred to spread the charged particles uniformly across the other electrode in advance, for example, by bringing the pixel to a defined state prior to selection, for example, by giving a reset pulse, if necessary in combination with a small alternating field component.

In a first embodiment, the electrophoretic medium is present between two substrates, each of which is provided with a switching electrode, while at least one of the substrates is provided with the further electrode. The charged particles may then be present in a liquid between the substrates, but it is alternatively possible that the electrophoretic medium is present in a microcapsule. In the first-mentioned case, the pixels may be mutually separated by a barrier.

In a further embodiment, the electrophoretic medium is present between two substrates, one of the substrates comprising the switching electrodes and the further electrode, notably when use is made of a lateral effect as described in "Development of In-Plane EPD", SID 2000 Digest, pp. 24-27.

In a preferred embodiment, the switching electrodes are comb-shaped and interdigital, and parts of the (insulated) further electrode are situated between the teeth of the two switching electrodes. Alternatively, the electrophoretic medium may be present in a prismatic structure as described in "New Reflective Display Based on Total Internal Reflection in Prismatic Microstructures", Proc. $20^{th}$ IDRC conference, pp. 311-314 (2000).

These and other aspects of the invention are apparent from and will be elucidated with reference to the embodiments described hereinafter.

Figure 3:
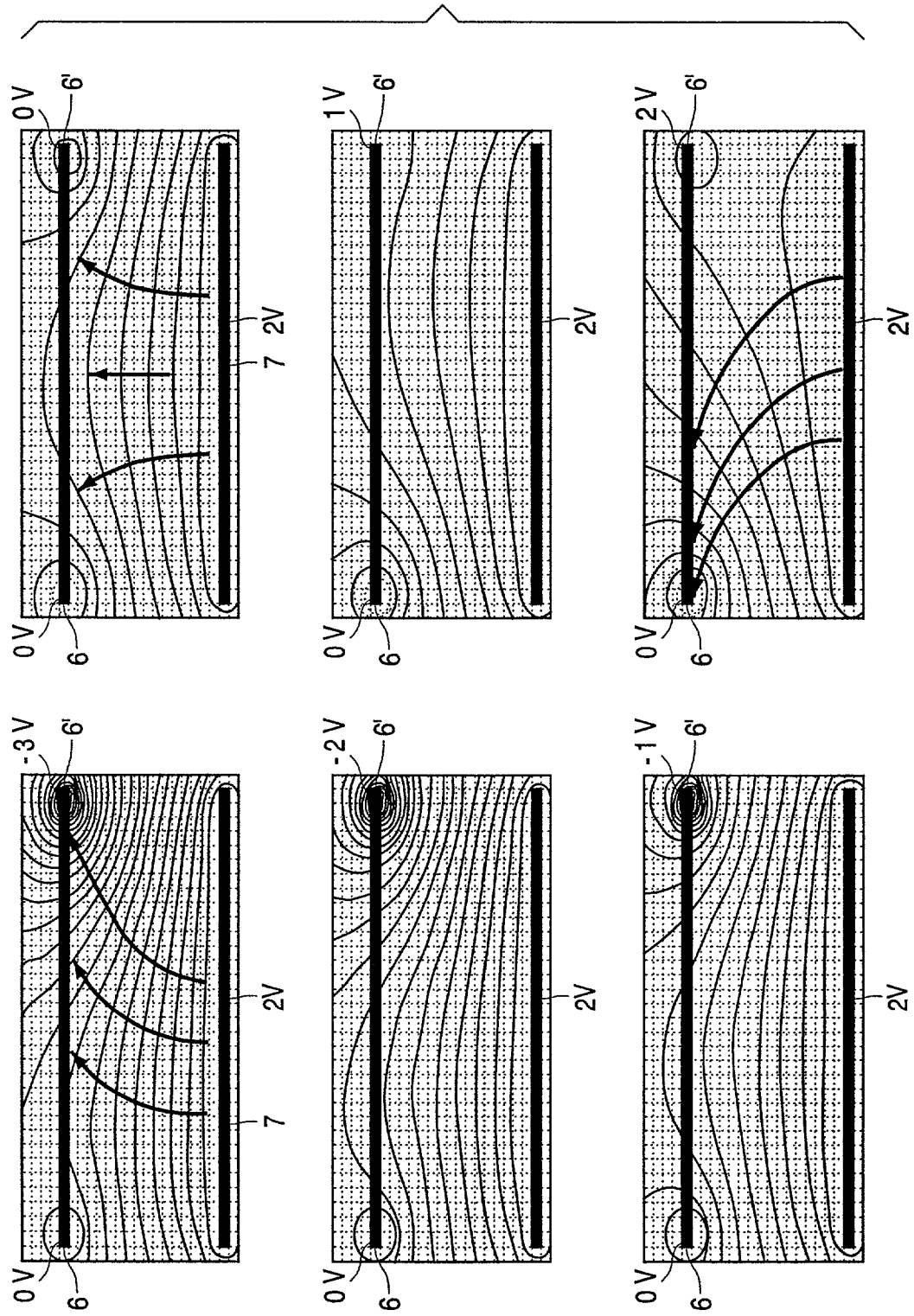
Figure 4A:
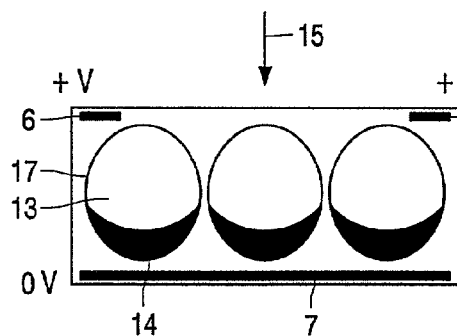
Figure 4B:
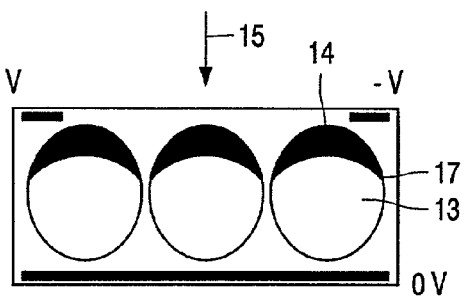
Figure 4C:
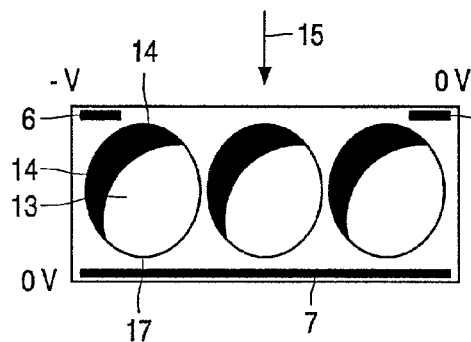
Figure 4D:
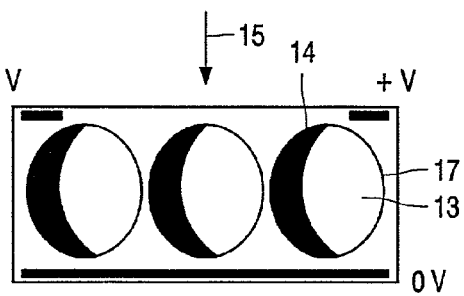
Figure 5:
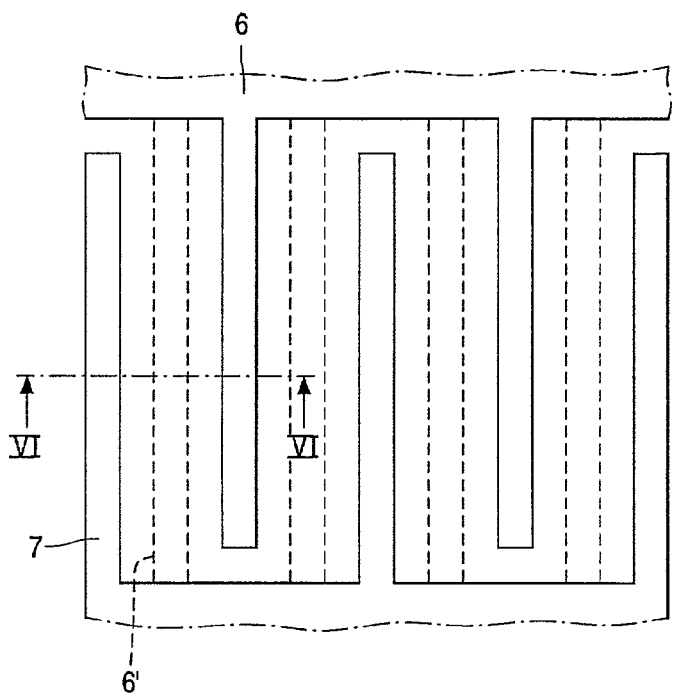
Figure 6:
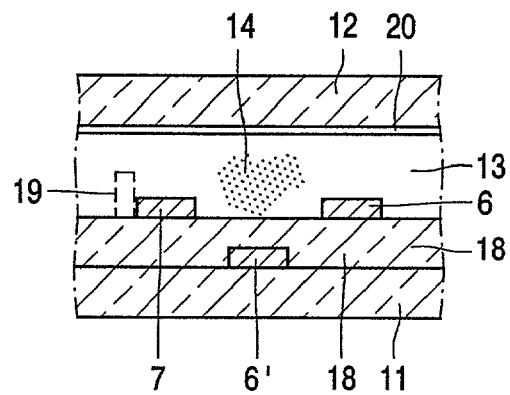
Figure 7:
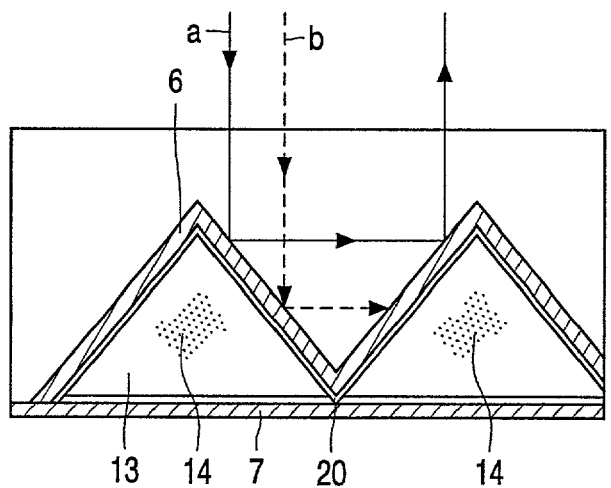
Figure 9:
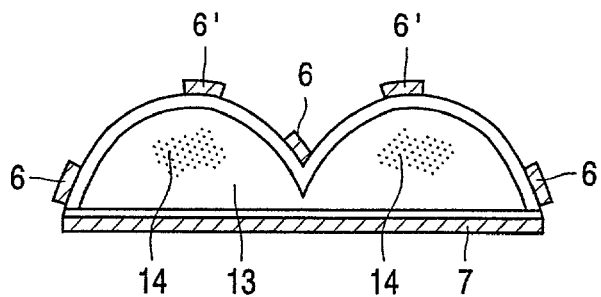
Figure 8A:
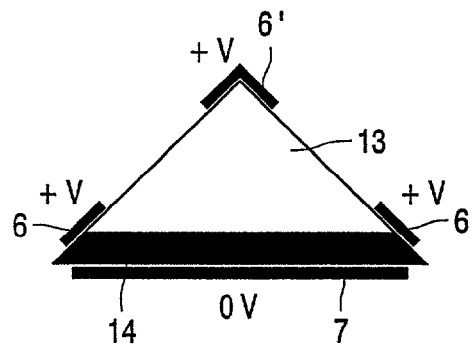
Figure 8B:
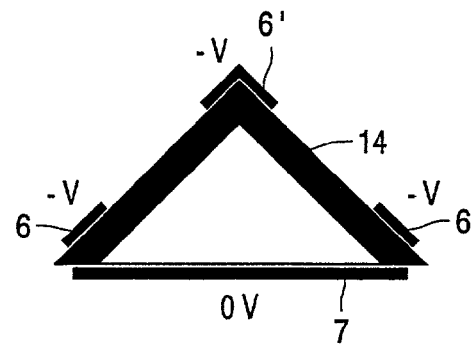
Figure 8C:
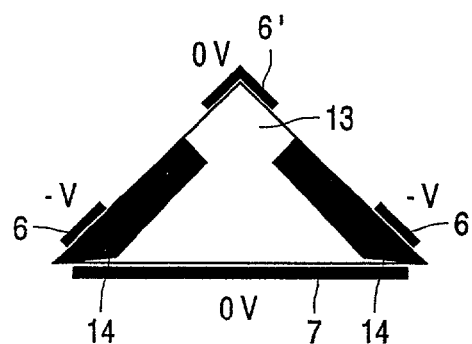
Figure 8D:
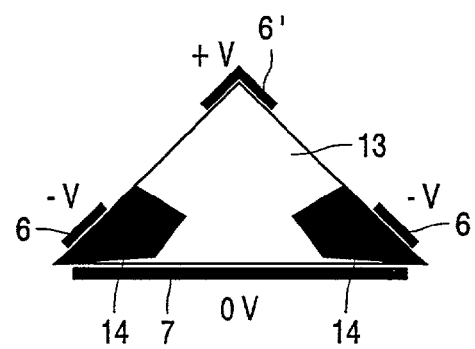
Figure 8E:
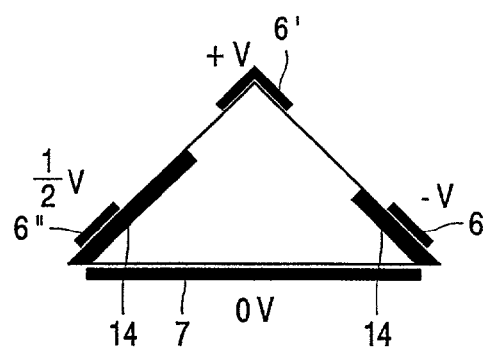

FIG. 3 shows the electric field variation in pixels of an electrophoretic display device according to the invention, for elucidating the invention, FIG. 4 shows another electrophoretic display device according to the invention, in which different grey values (intermediate optical states) have been realized, FIG. 5 is a plan view of a part of another electrophoretic display device according to the invention, FIG. 6 is a cross-section taken on the line VI-VI in FIG. 5, FIG. 7 shows yet another electrophoretic display device according to the invention, while FIGS. 8A-8E show how different grey values (intermediate optical states) have been realized in the display device of FIGS. 8A-8E, FIG. 9 shows a variant of FIG. 7, and The Figures are diagrammatic and not drawn to scale; corresponding parts are generally denoted by the same reference numerals.

Figure 1:
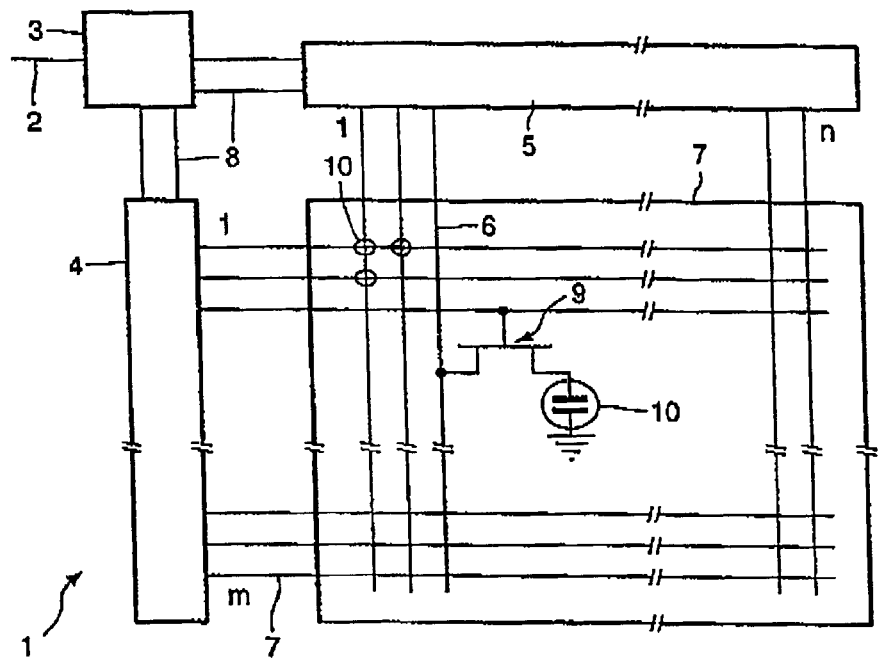
FIG. 1 shows diagrammatically a display device.

FIG. 1 shows an electric equivalent of a part of a display device 1 to which the invention is applicable. It comprises a matrix of pixels 10 at the area of crossings of row or selection electrodes 7 and column or data electrodes 6. The row electrodes 1 to m are consecutively selected by means of a row driver 4, while the column electrodes 1 to n are provided with data via a data register 5. To this end, incoming data 2 are first processed, if necessary, in a processor 3. Mutual synchronization between the row driver 4 and the data register 5 takes place via drive lines 8.

Drive signals from the row driver 4 and the data register 5 select a pixel 10 (referred to as passive drive). In known devices, a column electrode 6 acquires such a voltage with respect to a row electrode 7 that the pixel assumes one of two extreme states at the area of the crossing (for example, black or colored, dependent on the colors of the liquid and the electrophoretic particles).

If desired, drive signals from the row driver 4 may select the picture electrodes via thin-film transistors (TFTs) 9 whose gate electrodes are electrically connected to the row electrodes 7 and whose source electrodes 21 are electrically connected to the column electrodes 6 (referred to as active drive). The signal at the column electrode 6 is transferred via the TFT to a picture electrode, coupled to the drain electrode, of a pixel 10. The other picture electrodes of the pixel 10 are connected to, for example, ground, for example, by means of one (or more) common counter electrode(s). In the example of FIG. 1, such a TFT 9 is shown diagrammatically for only one pixel 10.

In a display device according to the invention, each pixel is provided with a further electrode and drive means for supplying the further electrode with electric voltages. This is shown in FIG. 2, in which a cross-section of such a pixel provided with a third electrode 6' is shown. The drive means comprise, for example, the data register 5 (and possibly a part of the driver), and extra column electrodes 6' (and an extra TFT in the case of active drive).

A pixel 10 (FIG. 2) comprises a first substrate 11, for example, of glass or a synthetic material, provided with a switching electrode 7, and a second, transparent substrate 12 provided with a switching electrode 6. The pixel is filled with an electrophoretic medium, for example, a white suspension 13 containing, in this example, positively charged, black particles 14. The pixel is further provided with a third electrode 6' (and, if necessary, as described above, with drive means not shown in FIG. 2) so as to realize intermediate optical states via electric voltages across the third electrode. In this respect, it should be noted that the third electrode 6' also influences the switching behavior between the two extreme states. As will be further explained hereinafter, the voltage across this electrode also influences the two extreme states.

Figure 2A:
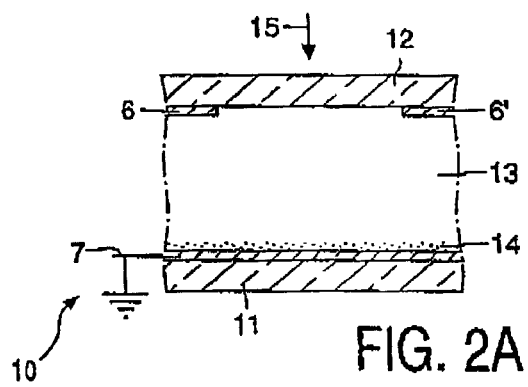
FIGS. 2a-2d show pixels of an electrophoretic display device according to the invention, in which different grey values (intermediate optical states) have been realized.
Figure 2B:
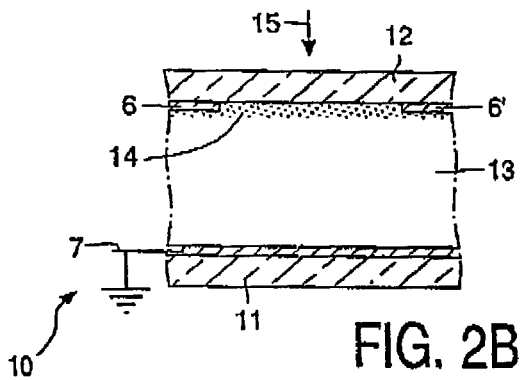

For example, in FIG. 2A, the switching electrode 7 is connected to ground, while both electrodes 6, 6' are connected to a voltage +V. The black particles 14 (positively charged in this example) move towards the electrode at the lowest potential, in this case the electrode 7. Viewed from the viewing direction 15, the pixel now has the color of the liquid 13 (which is white in this case). In FIG. 2B, the switching electrode 7 is connected to ground, while both electrodes 6, 6' are connected to a voltage −V. The positively charged, black particles 14 move towards the lowest potential, in this case towards the potential plane defined by the electrodes 6, 6', parallel to and just alongside the substrate 12. Viewed from the viewing direction 15, the pixel now has the color of the black particles 14.

Figure 2C:
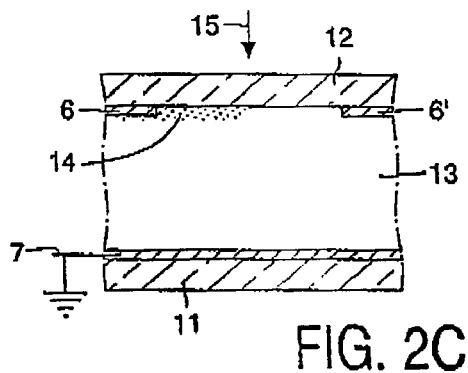
Figure 2D:
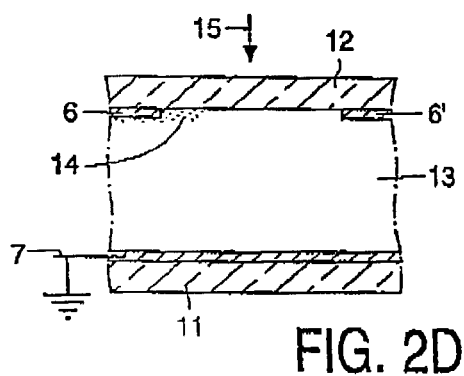

Also in FIG. 2C, the switching electrode 7 is connected to ground. The electrode 6 is again connected to a voltage −V. However, similarly as electrode 7, the third electrode 6' is now connected to ground. The positively charged, black particles 14 move towards the lowest potential, in this case an area around electrodes 6. This is even more strongly the case when the third electrode 6' is connected to a voltage +V, as is shown in FIG. 2D. Viewed from the viewing direction 15, the pixel now has only partly the color of the black particles 14 and partly the color of the white liquid. A grey hue is thereby obtained (dark grey in the case of FIG. 2C and light grey in the case of FIG. 2D). This will be explained with reference to FIG. 3 in which the potential lines are shown for six possible combinations of voltages across the electrodes 6, 6', 7, and arrows 16 diagrammatically show the direction of the electric forces exerted on the particles 14.

Since the particles may not remain positioned on the substrate, for example, due to movement in the liquid, it may be advantageous to provide it with a sticking layer 20, as shown in FIG. 6.

Another possibility of limiting the movement of the liquid is the use of microcapsules as described in "Micro-encapsulated Electrophoretic Materials for Electronic Paper Displays", 20$^{th}$ IDRC conference, pp. 84-87 (2000). The electrophoretic medium, a liquid 13 containing positively charged particles 14, is now present in microcapsules 17 in a transparent substrate 18 (see FIG. 4).

In FIG. 4A, the switching electrode 7 is again connected to ground (0V), while the electrodes 6, 6' are again connected to a voltage +V. The positively charged, black particles 14 move towards the electrode at the lowest potential, in this case the electrode 7, i.e. towards the lowest part of the microcapsule 17. Viewed from the viewing direction 15, the pixel again has the color of the liquid 13. In FIG. 4B, the switching electrode 7 is connected to ground, while both electrodes 6, 6' are connected to a voltage −V. Viewed from the viewing direction 15, the pixel now has the color of the black particles 14.

Also in FIG. 4C, the switching electrode 7 is connected to ground. The electrode 6 is again connected to a voltage −V. However, similarly as electrode 7, the third electrode 6' is now connected to ground. The positively charged, black particles 14 move towards the lowest potential, in this case towards electrode 6 and are eventually largely present in the upper part of the microcapsule 17. Viewed from the viewing direction 15, the pixel now has a dark grey color. When the third electrode 6' is connected to a voltage +V, as is shown in FIG. 4D, the particles 14 are eventually present along an edge of the microcapsule 17. The pixel now has a light grey color.

In the display device of FIG. 5, the switching electrodes 6, 7 and the third electrode 6' are present on the same substrate 11, while the third electrode is separated from the switching electrodes by means of a layer 18 of a dielectric material. In this example, the switching electrodes 6, 7 are comb-shaped and interdigital, and parts of the third electrode 6' are situated between the teeth of the two switching electrodes. The comb shape is not strictly necessary. A lateral field between the two switching electrodes 6, 7 is also satisfactory. The cross-section shown in FIG. 6 may then depict both a complete pixel and a part of a pixel of the display device of FIG. 5. Illustrated in the same way as in FIGS. 2, 3, various electric field configurations can be introduced again, with the attendant different grey values. To prevent mixing of particles 14 belonging to two pixels, walls or barriers 19 may be provided. When a plurality of colors is used, it is often desirable to provide these walls or barriers (either or not across the full height of the pixel).

The electrophoretic medium may also be present in a prismatic structure as described in "New Reflective Display Based on Total Internal Reflection in Prismatic Microstructures", Proc. 20$^{th}$ IDRC conference, pp. 311-314 (2000). This is shown in FIGS. 7, 8. The known device comprises a prismatic structure of (in this example) a repetitive structure of hollow (for example, glass) triangles comprising a liquid 13 which contains positively charged particles. Dependent on the voltages across the electrodes 6, 7, the positively charged particles are present on the (bottom) electrode 7 of metal or on the ITO (top) electrode 6. In the first-mentioned case, an incident beam undergoes total reflection on the glass-liquid interface and is reflected (arrow a). In the second case, an incident beam is absorbed on the glass-liquid interface (arrow b).

Figure 10:
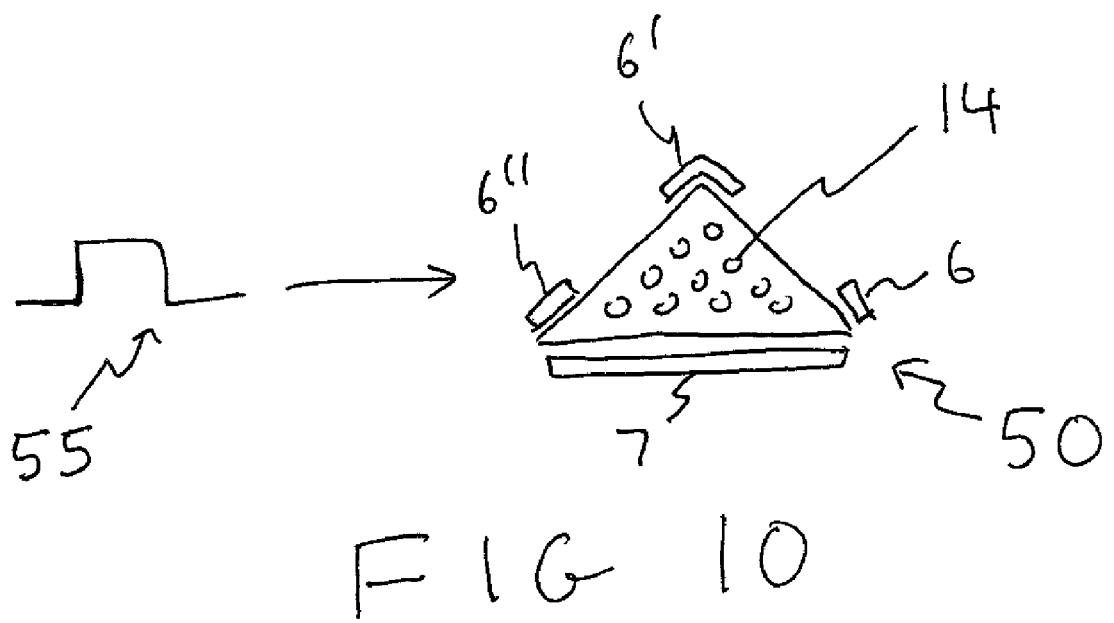

By introducing a third electrode 6' again, various electric field configurations with the attendant different grey values may be introduced again, similarly as in the examples of FIGS. 2 and 4. When light-absorbing, positively charged particles 14 are used in a liquid 13, the configurations 8A, 8B, 8C and 8D correspond to the colors white, black, dark grey and light grey. By introducing a further electrode 6", with the electrodes 6', 6" being supplied with different voltages, intermediate grey values can be realized (see FIG. 8E). FIG. 10 shows a reset pulse applied to a pixel according to one embodiment of the invention.

The invention is of course not limited to the examples described above. For example, four possible grey hues are obtained in the examples described above. It will be evident that a plurality of grey hues can be displayed at varying voltages and that a full grey scale can be realized in an analog manner. Several variations are also possible for the shape of the prismatic structure of FIG. 8, such as roof-shaped, spherical or cylindrical structures, as is shown diagrammatically in a cross-section, by way of example, in FIG. 9. Alternatively, the liquid 13 may be filled with a black ink containing white $TiO_2$ particles 14. To prevent crosstalk between pixels, the pixels should be electrically shielded from each other as much as possible. This may be realized by providing walls having a very high dielectric constant, or by conducting walls. The conducting walls may be connected to electrode 7 (ground).

A combination of one or more of said possibilities is alternatively applicable in practice.

The protective scope of the invention is not limited to the embodiments described.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The invention claimed is:

1. An electrophoretic display device comprising at least one pixel, an electrophoretic medium, first and second switching electrodes, first drive means via which the at least one pixel can be brought to different optical states, and means for bringing the at least one pixel to a defined state where charged particles are uniformly spread prior to selection of a final state using a reset pulse, wherein the at least one pixel comprises a third electrode, a fourth electrode and second drive means for realizing intermediate optical states via electric voltages across at least one of the third electrode and the fourth electrode, wherein the first electrode is in a first plane, the second electrode is in a second plane, the third electrode is in a third plane, and wherein the first, second and third planes are different planes, the fourth electrode being in the first plane and the second plane.

2. The electrophoretic display device as claimed in claim 1, wherein the electrophoretic medium is present between two substrates each comprising one of the first and second switching electrodes, at least one of the substrates being provided with the third electrode.

3. The electrophoretic display device as claimed in claim 1, wherein the electrophoretic medium is present in a microcapsule.

4. The electrophoretic display device as claimed in claim 1, wherein pixels are mutually separated by a barrier.

5. The electrophoretic display device as claimed in claim 1, wherein the electrophoretic medium is present between two substrates, one of the substrates comprising the first and second switching electrodes and the third electrode.

6. An electrophoretic display device comprising at least one pixel, an electrophoretic medium in a prismatic structure, first and second switching electrodes, first drive means via which the at least one pixel can be brought to different optical states, wherein the at least one pixel comprises a third electrode, a fourth electrode, second drive means for realizing intermediate optical states via electric voltages across at least one the third electrode and the fourth electrode, and means for bringing the at least one pixel to a defined state where charged particles are uniformly spread prior to selection of a final state using a reset pulse, wherein the first, second and third electrodes are in different planes, and the fourth electrode is in the first and second planes.

7. The electrophoretic display device as claimed in claim 6, wherein the prismatic structure is provided proximate to its base with the first and second switching electrodes, and the third electrode is situated proximate to a top of the prismatic structure.

8. The electrophoretic display device of claim 1, further comprising a sticking layer configured to maintain position on a substrate of particles included in the electrophoretic medium despite movement of the electrophoretic medium.

9. The electrophoretic display device of claim 1, wherein the intermediate optical states include different shades of grey formed by varying the electric voltages across the at least one of the third electrode and the fourth electrode.

10. The electrophoretic display device of claim 1, wherein the different optical states include a white state, a light grey state, a dark grey state which is darker than the light grey state, and a black state.

11. The electrophoretic display device of claim 6, further comprising a sticking layer configured to maintain position on a substrate of particles included in the electrophoretic medium despite movement of the electrophoretic medium.

12. The electrophoretic display device of claim 6, wherein the different optical states include different shades of grey formed by varying the electric voltages across the at least one of the third electrode and the fourth electrode.

13. The electrophoretic display device of claim 6, wherein the different optical states include a white state, a light grey state, a dark. grey state which is darker than the light grey state, and a black state.

* * * * *